(12) United States Patent
Ito et al.

(10) Patent No.: US 10,994,522 B2
(45) Date of Patent: May 4, 2021

(54) SILICONE SHEET

(71) Applicant: Fuji Polymer Industries Co., Ltd., Nagoya (JP)

(72) Inventors: Shingo Ito, Aichi (JP); Yuta Hatazawa, Aichi (JP)

(73) Assignee: Fuji Polymer Industries Co., Ltd., Aichi (JP)

( * ) Notice: Subject to any disclaimer, the term of this patent is extended or adjusted under 35 U.S.C. 154(b) by 0 days.

(21) Appl. No.: 16/591,281

(22) Filed: Oct. 2, 2019

(65) Prior Publication Data

US 2020/0031103 A1 Jan. 30, 2020

Related U.S. Application Data

(62) Division of application No. 15/946,427, filed on Apr. 5, 2018.

(30) Foreign Application Priority Data

Apr. 24, 2017 (JP) .............................. JP2017-085560

(51) Int. Cl.
*B32B 27/28* (2006.01)
*B32B 3/10* (2006.01)
(Continued)

(52) U.S. Cl.
CPC ............ *B32B 27/283* (2013.01); *C08L 83/04* (2013.01); *B32B 2307/308* (2013.01);
(Continued)

(58) Field of Classification Search
CPC ................ Y10T 428/15; B32B 27/283; B32B 2307/308; B32B 2457/08; B32B 3/10;
(Continued)

(56) References Cited

U.S. PATENT DOCUMENTS 5,446,115 A * 8/1995 Kobayashi ............ C07F 7/0896
428/446
6,317,324 B1 11/2001 Chen et al.
(Continued)

FOREIGN PATENT DOCUMENTS

EP 0 799 693 10/1997
JP 2002-084083 3/2002
(Continued)

OTHER PUBLICATIONS

Search Report issued in corresponding United Kingdom Patent Application No. GB1805441.1, dated Oct. 17, 2018, 3 pages.
(Continued)

*Primary Examiner* — Joanna Pleszczynska
(74) *Attorney, Agent, or Firm* — Hamre, Schumann, Mueller & Larson, P.C.

(57) ABSTRACT

A silicone sheet 1 of the present invention is a silicone sheet that is at least one selected from a silicone gel sheet and a silicone putty sheet. The silicone sheet has a Shore 00 hardness of 75 or less. The silicone sheet is cut in a thickness direction and cut faces 5a-5m and 6a-6f of the silicone sheet are adjacent to each other without gap. The cut faces of the silicone sheet are non-tacky, and the silicone sheet is separable at the cut faces. Preferably, the cut faces have a tackiness of 0.6 N or less based on a tackiness checker. The mounting method of the present invention is a method of mounting the above silicone sheet by pick and place mounting using an automatic mounting machine.

10 Claims, 4 Drawing Sheets

(51) Int. Cl.
 *B32B 3/14* (2006.01)
 *B32B 3/18* (2006.01)
 *C08L 83/04* (2006.01)

(52) U.S. Cl.
 CPC ....... *B32B 2405/00* (2013.01); *B32B 2457/08* (2013.01); *C08L 2203/20* (2013.01)

(58) Field of Classification Search
 CPC ........ B32B 3/14; B32B 3/18; H05K 7/20445; H05K 7/20454; H05K 7/20472; H05K 7/20481
 See application file for complete search history.

(56) References Cited

U.S. PATENT DOCUMENTS

| | | |
|---|---|---|
| 6,496,373 B1 | 12/2002 | Chung |
| 7,534,659 B2 | 5/2009 | Sutoh et al. |
| 2008/0268195 A1 | 10/2008 | Ko |
| 2010/0009109 A1 | 1/2010 | Ozawa |
| 2013/0136895 A1 | 5/2013 | Usui et al. |
| 2014/0346710 A1 | 11/2014 | Usui et al. |
| 2014/0349067 A1 | 11/2014 | Usui et al. |
| 2014/0370308 A1* | 12/2014 | Ishii ........................ B32B 25/20 428/447 |
| 2015/0008361 A1 | 1/2015 | Hattori |
| 2015/0020956 A1 | 1/2015 | Larson et al. |
| 2016/0150680 A1* | 5/2016 | Aramaki ............. H01L 23/3737 165/133 |
| 2017/0043553 A1* | 2/2017 | Tanaka ................ H01L 23/3735 |
| 2019/0177584 A1 | 6/2019 | Gubbels et al. |

FOREIGN PATENT DOCUMENTS

| | | |
|---|---|---|
| JP | 2003-183500 | 7/2003 |
| JP | 2008-280456 | 11/2008 |
| JP | 2010-021407 | 1/2010 |
| JP | 2012-023335 | 2/2012 |
| JP | 2014-041953 | 3/2014 |
| WO | 03/067658 | 8/2003 |
| WO | 2015/118210 | 8/2015 |

OTHER PUBLICATIONS

Office Action issued in corresponding German Patent Application No. 102018109490.6, dated May 12, 2020, 11 pages with translation.

Definition of monolayer (Merriam-Webster; www.merriam-webster.com/dictionary/monolayer), 2020, 1 page.

* cited by examiner

SILICONE SHEET

BACKGROUND OF THE INVENTION

1. Field of the Invention

The present invention relates to silicone sheets with non-tacky cut faces, and a mounting method using the same.

2. Description of Related Art

Recently, the performance of semiconductors such as CPUs has improved appreciably, and the amounts of heat generated by the semiconductors increase enormously. To cope with this, heat dissipaters are attached to electronic components generating heat, and heat conductive silicone gel sheets are used to improve the contact between the semiconductors and the heat dissipaters. At the same time, along with the size reduction and improvements in the performance of devices, the heat conductive silicone gel sheets are required to have softness, high heat conductivity, and thinness. Further, automatic mounting is demanded to cut production costs. Conventional heat conductive silicone gel sheets have strong tackiness in turn for pursuing softness, and the strong tackiness results in poor workability because most workers who handle the mounting handle the silicone gel sheets manually. The improvement in workability has also been demanded. Patent Documents 1 to 4 disclose silicone rubber sheets with cut faces.

PRIOR ART DOCUMENTS

Patent Documents

[Patent Document 1] JP 2014-041953 A
[Patent Document 2] JP 2012-023335 A
[Patent Document 3] JP 2010-021407 A
[Patent Document 4] JP 2002-084083 A

SUMMARY OF THE INVENTION

Conventional silicone sheets have a problem in that cut faces adhere to each other and unite, and improvements have been demanded.

For solving the above-described conventional problem, the present invention provides silicone sheets with non-tacky cut faces, and a mounting method using the same.

The silicone sheet of the present invention is a silicone sheet that is at least one selected from a silicone gel sheet and a silicone putty sheet. The silicone sheet has a Shore 00 hardness of 75 or less. The silicone sheet is cut in a thickness direction and cut faces of the silicone sheet are adjacent to each other without gap. The cut faces of the silicone sheet are non-tacky, and the silicone sheet is separable at the cut faces.

The mounting method of the present invention is a method of mounting the above-described silicone sheet by pick and place mounting using an automatic mounting machine.

In the present invention, the silicone sheet is at least one selected from a silicone gel sheet and a silicone putty sheet. The silicone sheet has a Shore 00 hardness of 75 or less. The silicone sheet is cut in a thickness direction and cut faces of the silicone sheet are adjacent to each other without gap. The cut faces of the silicone sheet are non-tacky, and the silicone sheet is separable at the cut faces. With this configuration, the cut faces do not stick together, and the silicone sheet can be easily handled, which improves workability. Moreover, automatic mounting machines can be used for pickup work, which greatly improves workability.

DETAILED DESCRIPTION OF THE INVENTION

Figure 1:
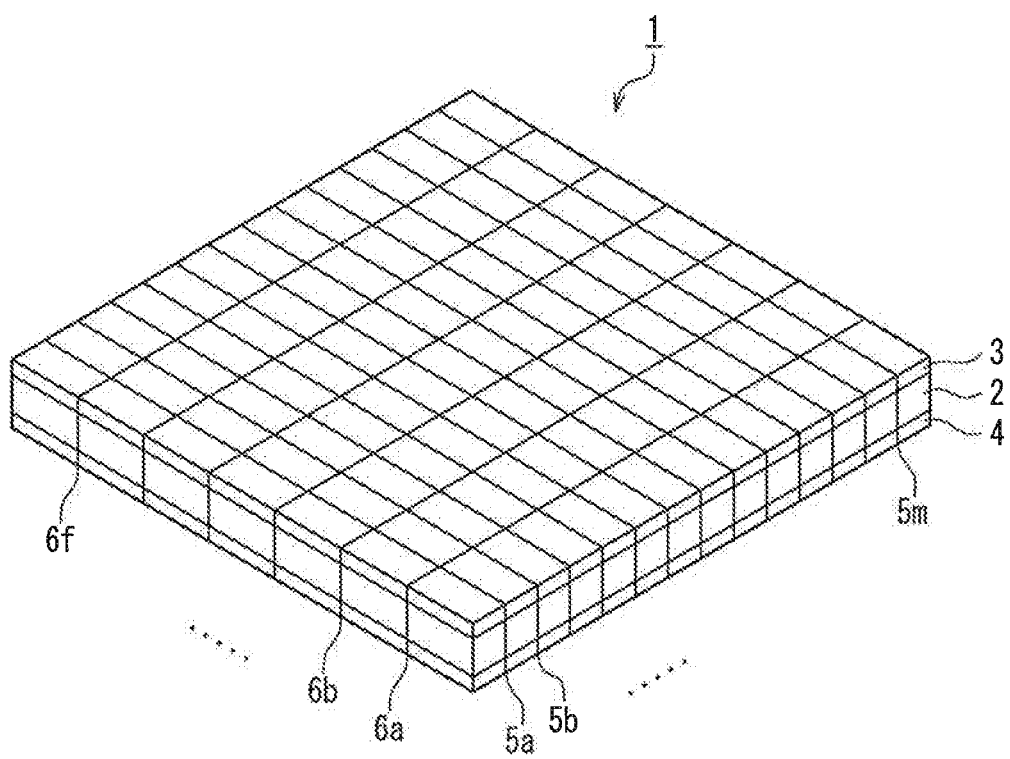
FIG. 1 is a perspective view of a silicone sheet in one embodiment of the present invention.

The present inventors studied the problem of the adhesion of cut faces of silicone sheets. A possible countermeasure against this problem is, for example, to subject the upper surfaces of silicone sheets to a silicone coating, or to apply mica powder or the like to product surfaces. However, the cut faces of silicone gel sheets cannot be stably coated, or the surfaces with mica powder become covered with bled silicone over time and lose the effect of the mica power. Generally, silicone gel sheets having a Shore 00 hardness of 75 or less have strong tackiness. The cut faces strongly stick together and are difficult to separate, which significantly decreases workability. To cope with this, by setting the tackiness of the cut faces of silicone gel sheets having a Shore 00 hardness of 75 or less to be preferably 0.6 N or less based on a tackiness checker, the workability of silicone gel sheets or silicone putty sheets improved. The lower limit of the Shore 00 hardness of the silicone sheets is preferably 5 or more, and more preferably 10 or more. The present inventors found that the non-tackiness of the cut faces can be maintained, e.g., by laser cutting or a heat cutter even when the silicone sheets are left for a long period of time, and the silicone gel sheets having a Shore 00 hardness of 75 or less with such cut faces can be handled easily without adhesion of the cut faces. Moreover, automatic machines can be used for pickup work, which greatly improves workability.

Preferably, the cut faces have a tackiness of 0.5 N or less based on a tackiness checker, because this further improves workability. Preferably, the lower limit of the tackiness based on a tackiness checker is 0.1 N or more.

Preferably, the silicone sheet has a heat conductivity of 0.5 W/mK or more. The problem of the adhesion of the cut faces has been often found in heat conductive silicone sheets.

Preferably, cover films are disposed on upper and lower surfaces of the silicone sheet. By disposing cover films on the upper and lower surfaces, the silicone sheet can be handled as one even when the sheet is separated at the cut faces; besides, the cover films protect the silicone sheet. At the time of mounting the silicone sheet by pick and place mounting using an automatic mounting machine, the cover films on the upper and lower surfaces are removed, and then the silicone sheet is arranged on a carrier tape and supplied to the automatic mounting machine.

Preferably, the cut faces exhibit non-tackiness by at least one selected from an application of a remover and high crosslinking. Thereby, the cut faces of the silicone sheet can exhibit non-tackiness further, and can be separated more easily. The remover may be alkoxysilane or a fluorine-containing compound. The alkoxysilane may be, e.g., an alkoxysilane having an alkyl group with 6 to 20 carbon atoms, and examples of which include: hexyltrimethoxysilane; hexyltriethoxysilane; octyltrimethoxysilane; octyltriethoxysilane; decyltrimethoxysilane; decyltriethoxysilane; dodecyltrimethoxysilane; dodecyltriethoxysilane; hexadecyltrimethoxysilane; hexadecyltriethoxysilane; octadecyltrimethoxysilane; and octadecyltriethoxysilane. These silane compounds may be used individually or in combinations of two or more. Examples of the fluorine-containing compound include "AsahiGuard (registered trademark) GS10" (trade name) (manufactured by Asahi Glass Co., Ltd.), "NK GUARD (registered trademark) FGN700T" (trade name) and "NK GUARD (registered trademark) NDN7000" (trade name) (both are manufactured by Nicca Chemical Co., Ltd.), which are on the market.

In the case of imparting the non-tackiness to the cut faces by high crosslinking, physical means can be adopted, including laser cutting, heating, plasma irradiation, electron beam irradiation, and corona irradiation. The heating is preferably performed under the following conditions, for example: temperature: 300 to 400° C.; and treatment time: 1 to 10 seconds. The laser cutting may be performed by, e.g., a $CO_2$ gas laser. The corona treatment is preferably performed under the following conditions, for example: voltage: 14 kV, transfer rate of an irradiation object: 30 mm/S; and the number of treatment: 2 to 30 times. By doing so, the cut faces can exhibit non-tackiness. These physical means can be combined appropriately, and may be combined with the application of a remover. The cutting and the non-tackiness treatment may be performed simultaneously.

Silicone gel sheets and silicone putty sheets for use in the assembly industry are prepared through steps of: producing a large raw sheet with a target thickness; and cutting the sheet into a desired size. Generally, the raw sheet is cut longitudinally and laterally with a cutter to produce rectangular sheets, and the rectangular sheets are delivered to the market in a state where they are in contact with each other without separation. When sufficiently hard rubber is used, cut sheets in a contact state do not adhere to each other. However, gel sheets and putty sheets in a contact state adhere to each other, and when part of the sheet is lifted, the adjacent sheets are lifted together. Since the tackinesses of the cut faces of the silicone gel sheets and the silicone putty sheets of the present invention are sufficiently low, the cut sheets in a contact state do not adhere to each other even when they are left for a long period of time, which facilitates mounting work.

In the mounting method of the present invention, the silicone sheet obtained in the above-described manner is mounted by pick and place mounting using an automatic mounting machine. This machine may be, e.g., an air pressure adsorption-desorption pick and place mounting machine.

Preferably, a heat conductive silicone sheet is obtained by crosslinking a compound with the following composition.

(A) base polymer component: 100 parts by weight of linear organopolysiloxane containing an average of two or more alkenyl groups each bound to a silicon atom located at both terminals of a molecular chain in a molecule;

(B) crosslinking component: less than 1 mol of organohydrogenpolysiloxane containing an average of two or more hydrogen atoms each bound to a silicon atom in a molecule, with respect to 1 mol of the alkenyl groups bound to silicon atoms contained in the component A;

(C) platinum-based metal catalyst; 0.01 to 1000 ppm in weight unit with respect to the component A; and (D) heat conductive particles: in the content of 100 to 2000 parts by weight with respect to 100 parts by weight of the component A.

The following describes the respective components.

(1) Base Polymer Component (Component A)

The base polymer component is an organopolysiloxane containing two or more alkenyl groups each bound to a silicon atom in a molecule, and the organopolysiloxane containing two alkenyl groups is the main ingredient (base polymer component) in the silicone rubber composition of the present invention. The organopolysiloxane has two alkenyl groups such as vinyl groups, allyl groups or the like whose carbon number is 2 to 8, particularly, 2 to 6, bound to silicon atoms in a molecule. It is desirable that the viscosity at 25° C. is 10 to 1000000 mPa·s, in particular 100 to 100000 mPa·s from the viewpoint of workability, curing property and the like.

Specifically, organopolysiloxane as expressed by the General formula (Chemical formula 1) below is used. The organopolysiloxane contains an average of two or more alkenyl groups each bound to a silicon atom located at a terminal of a molecular chain in a molecule. The side chain is a linear organopolysiloxane blocked with a triorganosiloxy group. It is desirable that the viscosity at 25° C. is 10 to 1000000 mPa·s from the viewpoint of workability, curing property and the like. The linear organopolysiloxane may contain a small amount of branched structure (trifunctional siloxane unit) in the molecular chain.

[Chemical formula 1]

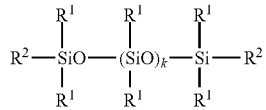

In the formula, $R^1$ are unsubstituted or substituted monovalent hydrocarbon groups that are identical to or different from each other and have no aliphatic unsaturated bond. $R^2$ is an alkenyl group, and k is 0 or a positive integer. Here, it is preferable that $R^1$, namely, the unsubstituted or substituted monovalent hydrocarbon groups having no aliphatic unsaturated bond, has 1 to 10, particularly 1 to 6 carbon atoms. The specific examples include: alkyl groups such as a methyl group, an ethyl group, a propyl group, an isopropyl group, a butyl group, an isobutyl group, a tert-butyl group, a pentyl group, a neopentyl group, a hexyl group, a cyclohexyl group, an octyl group, a nonyl group, and a decyl group; aryl groups such as a phenyl group, a tolyl group, a xylyl group, and a naphthyl group; aralkyl groups such as a benzyl group, a phenylethyl group, and a phenylpropyl group; and materials prepared by substituting a part or all of the hydrogen atoms in these groups with halogen atoms such as fluorine, bromine, and chlorine, a cyano group and the like. The examples include halogen substituted alkyl groups such as a chloromethyl group, a chloropropyl group, a bromoethyl group, and a trifluoropropyl group; a cyanoethyl group and the like. For the $R^2$, namely, the alkenyl group, a group having 2 to 6, in particular 2 to 3 carbon atoms, is preferred. Specific examples include: a vinyl group, an allyl group, a propenyl group, an isopropenyl group, a butenyl group, an isobutenyl group, a hexenyl group, and a cyclohexenyl group. A vinyl group is preferred. In the General formula (1), k is 0 or a positive integer satisfying $0 \leq k \leq 10000$ in general. Preferably, it is an integer satisfying $5 \leq k \leq 2000$, and more preferably $10 \leq k \leq 1200$.

For the organopolysiloxane of the component A, organopolysiloxanes each having three or more alkenyl groups each bound to a silicon atom in a molecule may be used together. The number of the alkenyl groups is 3 to 30, and preferably 3 to about 20. The alkenyl group has 2 to 8, and in particular 2 to 6 carbon atoms, and the examples include a vinyl group and an allyl group. The molecular structure may be linear, cyclic, branched, or three-dimensionally reticular. Preferably, it is a linear organopolysiloxane having a main chain composed of repetitions of diorganosiloxane unit and the molecular chain is blocked at both terminals with triorganosiloxy groups, and it has a viscosity at 25° C. in the range of 10 to 1000000 mPa·s and in particular, 100 to 100000 mPa·s.

Each of the alkenyl groups may be bonded to any part of the molecule. For example, the alkenyl group may be bonded to either a silicon atom that is at the end of the molecular chain or a silicon atom that is not at the end (but in the middle) of the molecular chain. A particularly desirable example is a linear organopolysiloxane that has one to three alkenyl groups on each of the silicon atoms located at both terminals of a molecular chain represented by a General formula (Chemical formula 2) below (it should be noted that in a case where the total number of the alkenyl groups bound to the silicon atoms at the both terminals of the molecular chain is less than 3, at least one alkenyl group bound to a silicon atom not located at the terminal of the molecular chain (i.e., in the middle of the molecular chain) is included (as the substituent in the diorganosiloxane unit, for example)), which has a viscosity in the range of 10 to 1,000,000 mPa·s as mentioned above at 25° C. from the viewpoint of workability, curing property and the like. The linear organopolysiloxane may contain in the molecular chain a small amount of branched structure (trifunctional siloxane unit).

[Chemical formula 2]

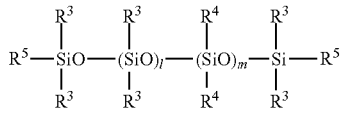

In the formula, $R^3$ are unsubstituted or substituted monovalent hydrocarbon groups that are identical to or different from each other, and at least one of the $R^3$ is an alkenyl group. $R^4$ are unsubstituted or substituted monovalent hydrocarbon groups that are identical to or different from each other and have no aliphatic unsaturated bond; $R^5$ is an alkenyl group; and, l and m are 0 or positive integers. Here, it is preferable that $R^3$, namely, the unsubstituted or substituted monovalent hydrocarbon groups, has 1 to 10, particularly 1 to 6 carbon atoms. The specific examples include: alkyl groups such as a methyl group, an ethyl group, a propyl group, an isopropyl group, a butyl group, an isobutyl group, a tert-butyl group, a pentyl group, a neopentyl group, a hexyl group, a cyclohexyl group, an octyl group, a nonyl group, and a decyl group; aryl groups such as a phenyl group, a tolyl group, a xylyl group, and a naphthyl group; aralkyl groups such as a benzyl group, a phenylethyl group, and a phenylpropyl group; alkenyl groups such as a vinyl group, an allyl group, a propenyl group, an isopropenyl group, a butenyl group, a hexenyl group, a cyclohexenyl group, and an octenyl group; and materials prepared by substituting a part or all of the hydrogen atoms in these groups by halogen atoms such as fluorine, bromine, and chlorine, a cyano group and the like. The examples include halogen substituted alkyl groups such as a chloromethyl group, a chloropropyl group, a bromoethyl group, and a trifluoropropyl group; a cyanoethyl group and the like.

For $R^4$, namely, the monovalent hydrocarbon group, a group having 1 to 10, in particular 1 to 6 carbon atoms, is preferred. And the examples are similar to the specific examples of the above $R^1$, although the alkenyl group is not included. For $R^5$, namely, the alkenyl group, a group having 2 to 6, in particular 2 to 3 carbon atoms is preferred. Specific examples are similar to those of $R^2$ in the above formula (Chemical formula 1). A vinyl group is preferred.

In the formula, l and m are 0 or positive integers satisfying $0 < l+m \leq 10000$, preferably $5 \leq l+m \leq 2000$, and more preferably $10 \leq l+m \leq 1200$. They are integers satisfying $0 < l/(l+m) \leq 0.2$, and preferably $0.0011 < l/(l+m) \leq 0.1$.

(2) Crosslinking Component (Component B)

The organohydrogenpolysiloxane of the component B of the present invention acts as a crosslinking agent. As a result of addition reaction (hydrosilylation) of the SiH group in the component and the alkenyl group in the component A, a cured material is formed. There is no particular limitation on the organohydrogenpolysiloxane as long as it has two or more hydrogen atoms each bound to a silicon atom (i.e., SiH group) in a molecule, and the molecular structure of the organohydrogenpolysiloxane may be linear, cyclic, branched or three-dimensionally reticular. The number of the silicon atoms in a molecule (i.e., degree of polymerization) can be 2 to 1000, and particularly 2 to about 300.

There is no particular limitation on the locations of the silicon atoms to which the hydrogen atoms are to be bound, and the locations may be the terminals or not (in the middle) of the molecular chain. Examples of the organic groups bound to the silicon atoms other than the hydrogen atoms include unsubstituted or substituted monovalent hydrocarbon groups that do not have an aliphatic unsaturated bond, which are similar to $R^1$ in the above General formula (Chemical formula 1).

The organohydrogenpolysiloxane of the component B may have any of the following structures, for example.

[Chemical formula 3]

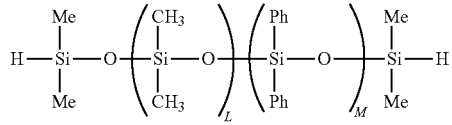

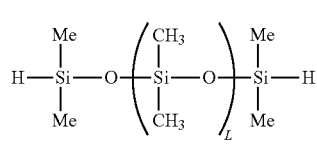

[Chemical formula 4]

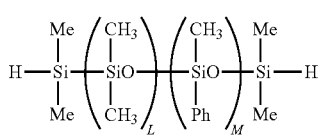

[Chemical formula 5]

In the above formulae, Ph is an organic group including at least one of a phenyl group, an epoxy group, an acryloyl group, a methacryloyl group, and an alkoxy group. L is an integer in the range of 0 to 1,000, particularly 0 to 300. M is an integer in the range of 1 to 200.

(3) Catalyst Component (Component C)

The component C is a catalyst component that accelerates the first curing of the composition of the present invention. The component C may be a catalyst used for a hydrosilylation reaction. Examples of the catalyst include platinum group metal catalysts such as platinum-based, palladium-based, and rhodium-based catalysts. The platinum-based catalysts include, e.g., platinum black, platinic chloride, chloroplatinic acid, a reaction product of chloroplatinic acid and monohydric alcohol, a complex of chloroplatinic acid and olefin or vinylsiloxane, and platinum bisacetoacetate. The component C may be mixed in an amount that is required for curing, and the amount can be appropriately adjusted in accordance with the desired curing rate or the like. It is preferable that the component C is added at 0.01 to 1000 ppm based on the weight of metal atoms to the component A.

(4) Heat Conductive Particles (Component D)

It is preferable that the heat conductive particles (component D) are added in the range of 100 to 2500 parts by weight with respect to 100 parts by weight of the matrix component (component A). Thereby, it is possible to keep high heat conductivity. The material of the heat conductive particles is preferably at least one selected from the group consisting of alumina, zinc oxide, magnesium oxide, aluminum nitride, boron nitride, aluminum hydroxide and silica. Various shapes such as spherical, scales, and polyhedra can be employed. When alumina is used, α-alumina with a purity of 99.5 wt % or more is preferred. The specific surface area of the heat conductive particles is preferably in the range of 0.06 to 10 m$^2$/g. The specific surface area is BET specific surface area, and the measurement is carried out in accordance with the method of JIS R1626. In a case of applying an average particle size, the preferred range is 0.1 to 100 μm. In measurement of the particle size, a laser diffracted light scattering method is applied to measure a particle size at 50%. The measurement instrument is for example a laser diffraction/scattering particle size distribution analyzer LA-950S2 manufactured by Horiba, Ltd.

For the heat conductive particles, two or more types of inorganic particles having different average particle sizes may be used together. Thereby, the spaces between the heat conductive particles having a larger diameter are filled with the heat conductive inorganic particles having a smaller diameter, and thus, filling approximating the maximal density is obtained to enhance the heat conductivity.

It is preferable that the inorganic particles are surface treated with a silane compound or its partial hydrolysate. The silane compound is expressed by R(CH$_3$)$_a$Si(OR')$_{3-a}$, where R represents a substituted or unsubstituted organic group having 1 to 20 carbon atoms, R' represents an alkyl group having 1 to 4 carbon atoms, and a is 0 or 1. Examples of an alkoxysilane compound (simply referred to as "silane" in the following) expressed by R(CH$_3$)$_a$Si(OR')$_{3-a}$, where R represents a substituted or unsubstituted organic group having 1 to 20 carbon atoms, R' represents an alkyl group having 1 to 4 carbon atoms, and a is 0 or 1, include the following: methyltrimethoxysilane; ethyltrimethoxysilane; propyltrimethoxysilane; butyltrimethoxysilane; pentyltrimethoxysilane; hexyltrimethoxysilane; hexyltriethoxysilane; octyltrimethoxysilane; octyltriethoxysilane; decyltrimethoxysilane; decyltriethoxysilane; dodecyltrimethoxysilane; dodecyltriethoxysilane; hexadodecyltrimethoxysilane; hexadodecyltriethoxysilane; octadecyltrimethoxysilane; and octadecyltriethoxysilane. These silane compounds may be used individually or in combinations of two or more. The alkoxysilane and one-end silanol siloxane may be used together as the surface treatment agent. In this case, the surface treatment may include adsorption in addition to a covalent bond. It is preferable that the particles with an average particle size of 2 μm or more are added in an amount of 50 wt % or more when the total amount of particles is 100 wt %.

(5) Other Components

The composition of the present invention may include components other than the above as needed. For example, the composition may include an inorganic pigment such as colcothar, and alkyltrialkoxysilane used, e.g., for the surface treatment of a filler. Moreover, alkoxy group-containing silicone may be added, e.g., for the surface treatment of a filler.

Figure 2A:
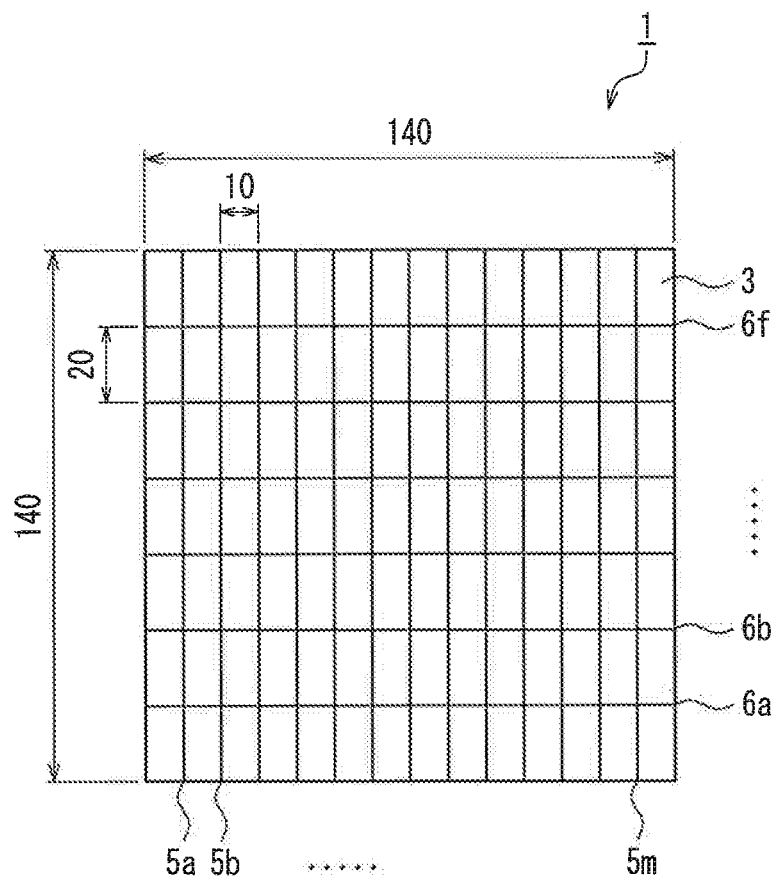
FIG. 2A is a plan view of the silicone sheet.
Figure 2B:
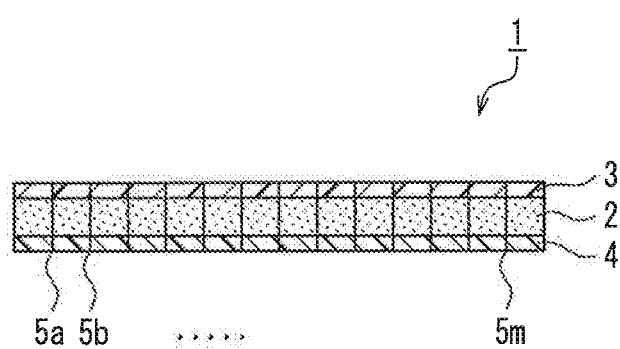
FIG. 2B is a cross-sectional view of the silicone sheet.

Next, the present invention is explained with reference to the attached drawings. The same components are denoted with the same reference numerals in the drawings. FIG. 1 is a perspective view of a silicone sheet 1 in one embodiment of the present invention, FIG. 2A is a plan view of the silicone sheet 1, and FIG. 2B is a cross-sectional view of the silicone sheet 1. For example, the silicone sheet 1 is 140 mm long, 140 mm wide, and 5.0 mm thick in which polyester (PET) films 3 and 4 are laminated on both surfaces of a silicone sheet layer 2, and the silicone sheet 1 is cut by a CO$_2$ gas laser so that each of the cut pieces would be 20 mm long and 10 mm wide. The reference numeral 3 indicates a polyester (PET) film located on the front surface, reference numerals 5a, 5b, . . . 5m indicate longitudinal cut lines by the CO$_2$ gas laser, and 6a, 6b, . . . 6f indicate lateral cut lines by the CO$_2$ gas laser. The longitudinal and lateral cut faces are non-tacky.

FIGS. 3A to 3F are process drawings illustrating pick and place mounting using an automatic mounting machine in one embodiment of the present invention.

Figure 3A:
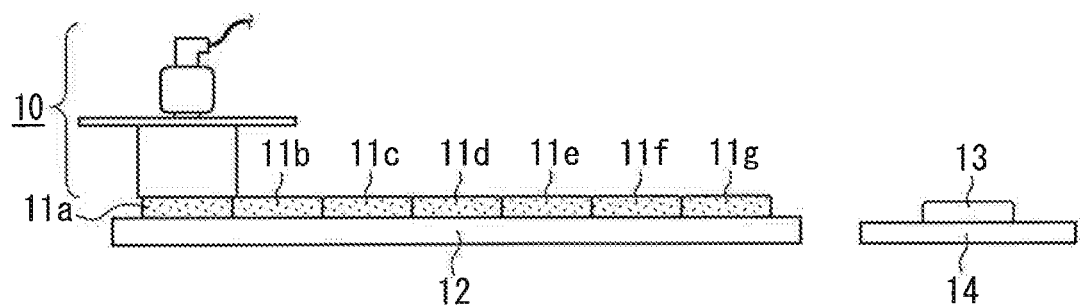
FIG. 3A is an explanatory view illustrating a state in which a tip part of an automatic mounting machine moves to the surface of the silicone sheet, in pick and place mounting using an automatic mounting machine in one embodiment of the present invention.

(1) FIG. 3A is an explanatory view illustrating a state in which a tip part 10 of the automatic mounting machine moves to the surface of a silicone sheet 11a. Silicone sheets 11a to 11g are arranged on a carrier tape 12 and send to an end (on the left side) one by one. At a location on the right side spaced apart from the carrier tape 12, an electronic component 13 on which a CPU is mounted is arranged on a circuit board 14.

Figure 3B:
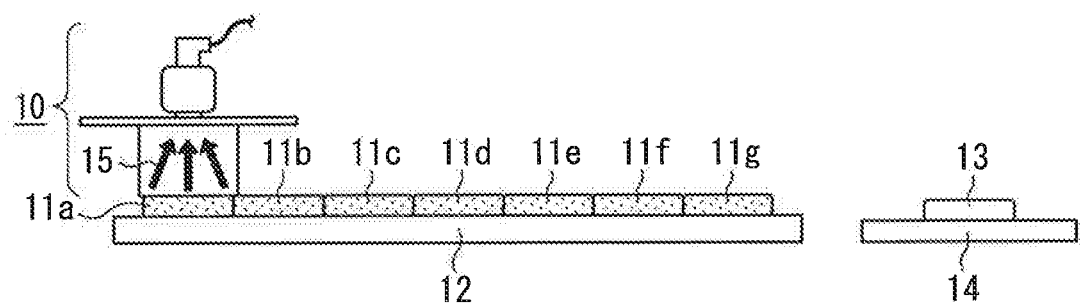
FIG. 3B is an explanatory view illustrating a state in which the tip part of the automatic mounting machine sucks air to adsorb the silicone sheet.

(2) FIG. 3B is an explanatory view illustrating a state in which the tip part 10 of the automatic mounting machine sucks air in directions of arrows 15 to adsorb the silicone sheet 11a.

Figure 3C:
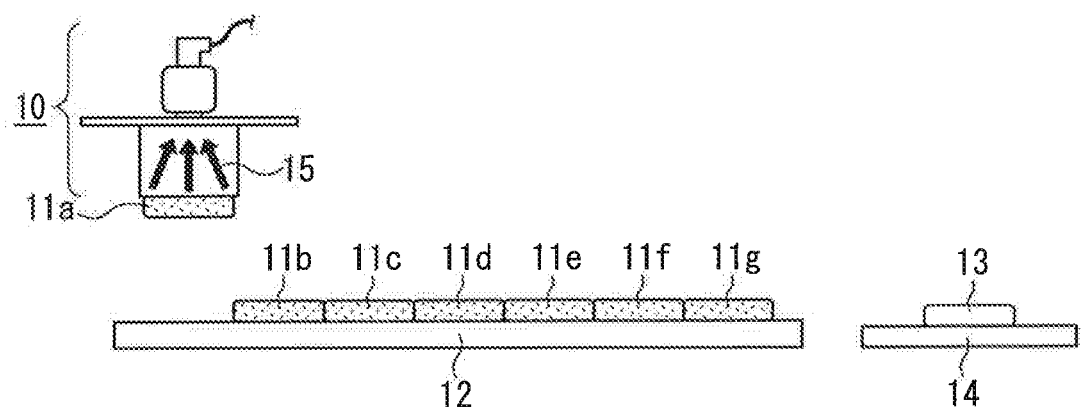
FIG. 3C is an explanatory view illustrating a pickup process in which the tip part of the automatic mounting machine in the state of adsorbing the silicone sheet moves upward.

(3) FIG. 3C is an explanatory view illustrating a pickup process in which the tip part 10 of the automatic mounting machine in the state of adsorbing the silicone sheet 11a moves upward.

Figure 3D:
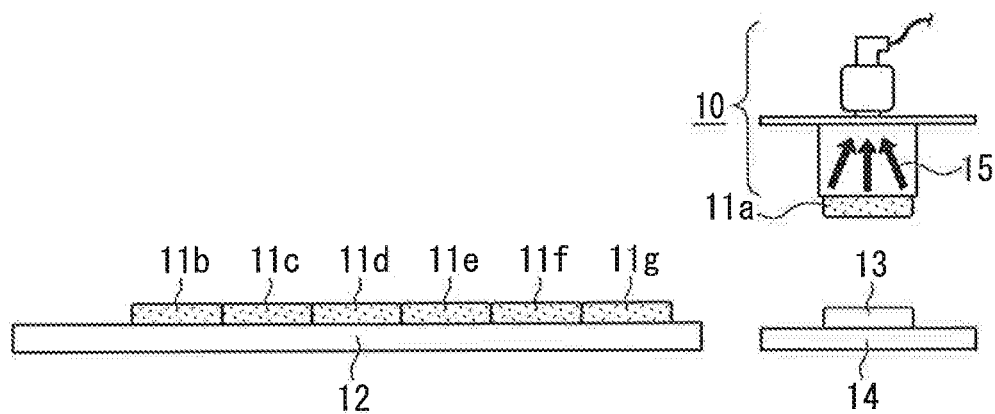
FIG. 3D is an explanatory view illustrating a state in which the tip part of the automatic mounting machine in the state of adsorbing the silicone sheet moves above an electronic component on which a CPU is mounted.

(4) FIG. 3D is an explanatory view illustrating a state in which the tip part 10 of the automatic mounting machine in the state of adsorbing the silicone sheet 11a moves above the electronic component 13 on which the CPU is mounted.

Figure 3E:
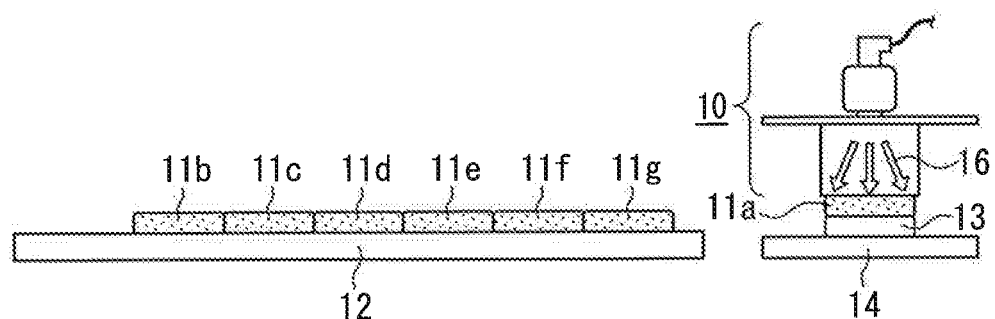
FIG. 3E is an explanatory view illustrating a state in which the tip part of the automatic mounting machine positions the silicone sheet above the electronic component, and releases air to mount the silicone sheet on the electronic component.

(5) FIG. 3E is an explanatory view illustrating a state in which the tip part 10 of the automatic mounting machine positions the silicone sheet 11a above the electronic component 13, and releases air as indicated by arrows 16 to mount the silicone sheet 11a on the electronic component 13.

Figure 3F:
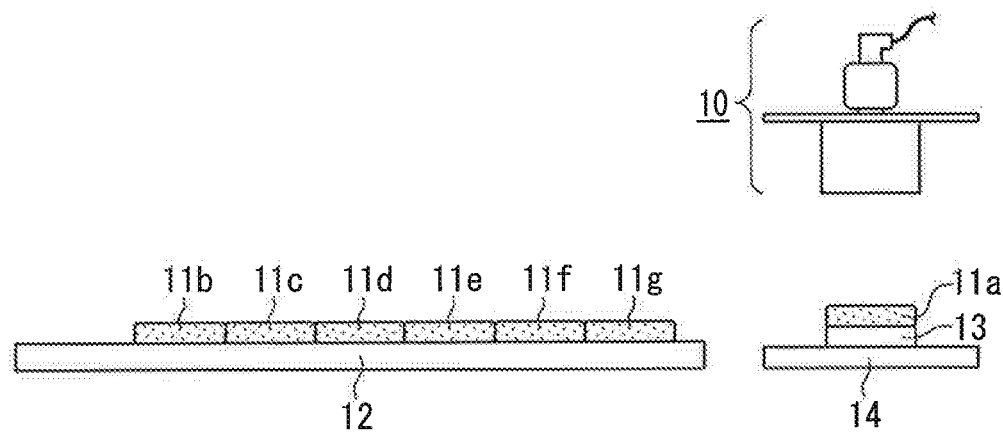
FIG. 3F is an explanatory view illustrating a state in which the tip part of the automatic mounting machine moves upward to complete one cycle.

(6) FIG. 3F is an explanatory view illustrating a state in which the tip part 10 of the automatic mounting machine moves upward to complete one cycle.

EXAMPLES

The present invention shall be described by way of Examples below, but the present invention is not limited to these Examples.

<Hardness>

The hardness was measured using a Bareiss automatic rubber hardness tester in accordance with Shore 00, ASTM D2240.

<Tackiness>

The tackiness was measured using a tackiness checker (manufactured by Toyo Seiki Co., Ltd.). A contact was pressed against an object under a given pressure for a given time, and a stress generated at the time of separating the contact from the object is detected by a load-cell-based system. According to an example, Tackiness Checker Model HTC-1 (manufactured by Toyo Seiki Co., Ltd.) has been used. The press force was 5 N and the press time was 3 sec.

Example 1

(1) Silicone Component

Two-part, room temperature curing (two-part RTV) silicone rubber was used as a silicone component. A base polymer component (component A), a crosslinking component (component B), and a platinum-based metal catalyst (component C) had been previously added to the two-part RTV silicone rubber.

(2) Heat Conductive Particles (a) Small-Size Heat Conductive Particles

The small-size heat conductive particles were composed of alumina with an average particle size of 1 μm and were surface treated with a silane coupling agent. The amount of the small-size heat conductive particles added was 50 parts by weight per 100 parts by weight of the silicone component. The average particle size was measured with a laser diffracted light scattering method to determine a particle size at 50% (by mass) (the same applies to the following). The measurement instrument is for example a laser diffraction/scattering particle size distribution analyzer LA-950S2 manufactured by Horiba, Ltd.

(b) Middle-Size Heat Conductive Particles

The middle-size heat conductive particles were composed of alumina with an average particle size of 3 μm and were surface treated with a silane coupling agent. The amount of the middle-size heat conductive particles added was 200 parts by weight per 100 parts by weight of the silicone component.

(c) Large-Size Heat Conductive Particles

The large-size heat conductive particles included two types of particles, both of which were not surface treated with a silane coupling agent and were used as they were.

(i) The particles of alumina with an average particle size of 50 μm were used. The amount of the particles added was 200 parts by weight per 100 parts by weight of the silicone component.

(d) Amount of Heat Conductive Particles Added

A total of 450 parts by weight of the heat conductive particles, i.e., 50 parts by weight of the small-size heat conductive particles, 200 parts by weight of the middle-size heat conductive particles, and 200 parts by weight of the large-size heat conductive particles were added to 100 parts by weight of the silicone component.

2. Sheet Forming and Processing Method

A 3 mm thick metal frame was placed on a polyester film that had been subjected to a release treatment. Subsequently, a compound was poured into the metal frame, on which another polyester film that had been subjected to a release treatment was disposed. This layered product was cured at a pressure of 5 MPa and a temperature of 120° C. for 10 minutes, thereby forming a silicone rubber sheet 140 mm long, 140 mm wide, and 5.0 mm thick. A heat dissipating sheet obtained had a heat conductivity of 1.5 W/mK and a Shore 00 hardness of 15.

Polyester (PET) films each having a thickness of 100 μm were laminated on the both surfaces of the silicone rubber sheet, the silicone rubber sheet in this state was cut using a $CO_2$ gas laser (output: 30 W) so that each of the cut pieces would be 20 mm long and 10 mm wide, and the cut faces were subjected to high crosslinking. Soot and the like generated during processing were wiped off to complete the processing.

The tackiness of the cut faces of the silicone rubber sheet was measured using a tackiness checker, which resulted in 0.3 N. The cut faces of the silicone rubber sheet after being left for one week did not stick together, and there was no problem in workability.

The air pressure adsorption-desorption pick and place work of the cut silicone rubber sheet using an automatic mounting machine (6-axis robot manufactured by Yasukawa Electric Corporation), which is schematically illustrated in FIGS. 3A to 3F, was performed. The cut pieces of the silicone rubber sheet could be adsorbed individually, and there was no problem in workability.

Comparative Example 1

A silicone rubber sheet produced in the above-described manner was cut using a Guillotine cutter so that each of the cut pieces would be 20 mm long and 10 mm wide. The tackiness of the cut faces of the silicone rubber sheet was measured using a tackiness checker, which resulted in 0.8 N. The cut faces of the silicone rubber sheet after being left for one week were stuck together, and this required much time to handle the silicone rubber sheet.

The air pressure adsorption-desorption pick and place work of the silicone rubber sheet using the automatic mounting machine (6-axis robot manufactured by Yasukawa Electric Corporation), which is schematically illustrated in FIGS. 3A to 3F, could not be performed because the cut faces were stuck together.

Example 2

One of the polyester films on either surface of the silicone rubber sheet produced in Example 1 was peeled off, and the silicone rubber sheet thus prepared was cut using a hot cutter (surface temperature: 350° C.) so that each of the cut pieces would be 20 mm long and 10 mm wide, and the cut faces were subjected to high crosslinking. The tackiness of the cut faces of the silicone rubber sheet was measured using a tackiness checker, which resulted in 0.5 N. The cut faces of the silicone rubber sheet after being left for one week did not stick together. The silicone rubber sheet had no problem in workability.

The sheet was packed in a carrier tape, and the air pressure adsorption-desorption pick and place work, which is schematically illustrated in FIGS. 3A to 3F, was performed. The cut pieces of the silicone rubber sheet could be adsorbed individually, and there was no problem in workability

DESCRIPTION OF REFERENCE NUMERALS

1: Silicone sheet
2: Silicone sheet layer
3, 4: Polyester (PET) films
5a, 5b, . . . 5m: Longitudinal cut lines
6a, 6b, . . . 6f: a lateral cut lines
10: Tip part of automatic mounting machine
11a-11g: Silicone sheet
12: Carrier tape
13: Electronic component on which a CPU is mounted
14: Circuit board
15, 16: Air directions of the tip part of automatic mounting machine The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A silicone sheet comprising:
    a cut silicone sheet layer that is at least one selected from a silicone gel sheet layer and a silicone putty sheet layer; and
    an upper cover film and a lower cover film laminated on an upper surface and a lower surface of the cut silicone sheet layer,
    wherein the cut silicone sheet layer has a Shore 00 hardness of 75 or less, and the cut silicone sheet layer is a monolayer,
    the upper cover film, the cut silicone sheet layer, and the lower cover film are cut in a thickness direction, and cut faces of the cut silicone sheet layer are adjacent to each other without gap,
    the cut faces of the cut silicone sheet layer have a tackiness of 0.6 N or less as determined by a tackiness checker, and
    the cut silicone sheet layer is separable at the cut faces.

2. The cut silicone sheet according to claim 1, wherein the silicone sheet layer has a heat conductivity of 0.5 W/mK or more.

3. The cut silicone sheet according to claim 1, wherein the cut faces exhibit non-tackiness due to an application of a remover.

4. The cut silicone sheet according to claim 3, wherein the remover is at least one selected from alkoxysilane and a fluorine-containing compound.

5. The cut silicone sheet according to claim 1, wherein the cut faces exhibit non-tackiness due to any one of laser cutting, heating, plasma irradiation, electron beam irradiation, and corona irradiation.

6. The cut silicone sheet according to claim 1, wherein the cut silicone sheet layer comprises heat conductive particles in an amount of 100 to 2500 parts by weight with respect to 100 parts by weight of a silicone component.

7. The cut silicone sheet according to claim 6, wherein the heat conductive particles are at least one selected from alumina, zinc oxide, magnesium oxide, aluminum nitride, boron nitride, aluminum hydroxide, and silica.

8. The cut silicone sheet according to claim 6, wherein the heat conductive particles are a combination of two or more types of inorganic particles having different average particle sizes.

9. The cut silicone sheet according to claim 6, wherein the heat conductive particles are surface treated with an alkoxysilane compound or a partial hydrolysate thereof, the alkoxysilane compound expressed by $R(CH_3)_a Si(OR')_{3-a}$, in which R represents a substituted or unsubstituted organic group having 1 to 20 carbon atoms, R' represents an alkyl group having 1 to 4 carbon atoms, and a is 0 or 1.

10. The cut silicone sheet according to claim 6, wherein the heat conductive particles comprise large particles with an average particle size of 50 μm or more and small particles with an average particle size of less than 50 μm, and
    the large particles are not surface treated and the small particles are surface treated.

* * * * *